United States Patent [19]
Garrett et al.

[11] 3,988,221
[45] Oct. 26, 1976

[54] ELECTROLYTIC REMOVAL OF HEAVY METAL IONS USING PARTICULATE SILICON ALLOYS

[75] Inventors: Donald E. Garrett; James P. McKaveney, both of Claremont, Calif.

[73] Assignee: Occidental Petroleum Corporation, Los Angeles, Calif.

[22] Filed: Mar. 20, 1975

[21] Appl. No.: 560,302

[52] U.S. Cl. .......................... 204/105 R; 204/108; 204/112; 204/222; 204/293
[51] Int. Cl.² ...................... C25C 1/12; C25C 1/06; C25C 7/02
[58] Field of Search .......... 204/23, 293, 294, 105 R, 204/222, , 108, 112

[56] References Cited
UNITED STATES PATENTS

| | | |
|---|---|---|
| 3,703,446 | 11/1972 | Haycock et al. .................. 204/23 |
| 3,716,459 | 2/1973 | Salter et al. ..................... 204/23 |
| 3,766,036 | 10/1973 | McKaveney ..................... 204/150 |
| 3,787,293 | 1/1974 | Kametani ......................... 204/108 |
| 3,854,940 | 12/1974 | Hoekje ............................. 204/293 |

OTHER PUBLICATIONS

E.M.F. Series.

*Primary Examiner*—R. L. Andrews
*Attorney, Agent, or Firm*—Christie, Parker & Hale

[57] ABSTRACT

A cathodic bed of essentially inert, low cost silicon metal alloys in particulate form is used for the removal of ionic impurities from aqueous solutions by electrolytic deposition. The alloys used are substantially inert to the strong acid used to regenerate the alloy surface and remove the deposited metals.

17 Claims, 1 Drawing Figure

U.S. Patent          Oct. 26, 1976          3,988,221
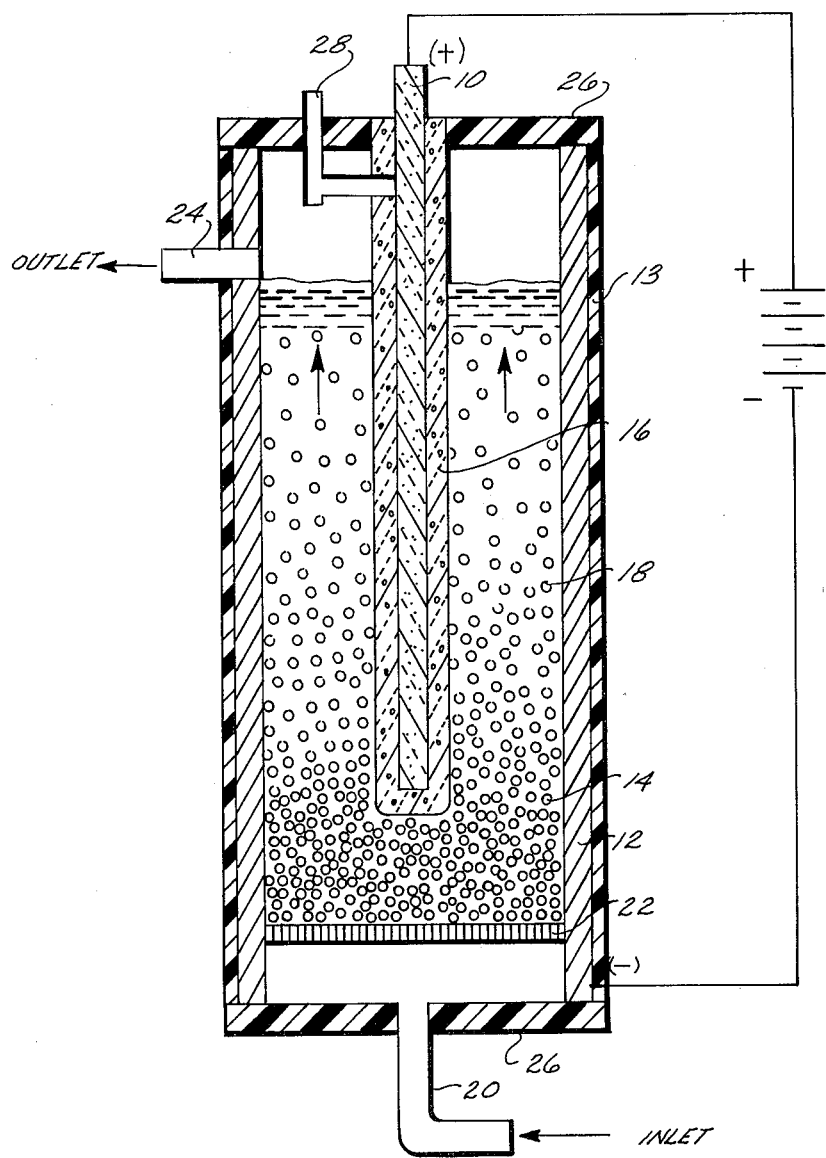

ELECTROLYTIC REMOVAL OF HEAVY METAL IONS USING PARTICULATE SILICON ALLOYS

BACKGROUND OF THE INVENTION

The present invention relates to removal of metal ions from aqueous solution by electrolytic deposition. The process, in general, involves subjecting the aqueous solution containing trace quantities of metal ions to the action of direct current in the presence of at least one anode and a particulate cathode.

The typical cell employed consists of an anode separated from the particulate cathode by water permeable membrane. The particulate cathode is associated with a conductor which serves as a buss to complete the circuit.

In operation, the particulate cathodic material is maintained in a fluidized or a semi-fluidized state by the upper flow of the aqueous fluid to be treated through the cell. Apparatus employed for this purpose are disclosed, for instance, in U.S. Pat. Nos. 3,244,605 and 3,457,152.

The major deficiency of the operation is the nature of the materials used as the cathodic particles. There have been used particles of free metals, such as lead, tin, nickel and copper, as well as glass and plastic substrates, such as spheres coated, with the metals.

While the metals are, in general, passive to the aqueous solutions containing the metallic impurities in the pH range of from 2 to 12, they are attacked by the strong oxidizing acids at a pH of less than about 1.0 used to recover the deposited metals. As a consequence, recovery whether chemical or by anodic displacement results in either a complete or significant dissolution of the base metal which serves as the cathode. This loss is not only expensive, but can lead to the creation of toxic solutions as, for instance, where the cathode is lead.

In U.S. Pat. No. 3,766,036 issued to one of us, there is disclosed a process for the selective separation of ionic metallic species from aqueous solutions by metallic displacement. The active substance employed is a silicon metal alloy containing up to about 65% by weight silicon. In use, the alloy is selected to have a net electrochemical potential greater than a metallic species to be separated from the aqueous solution and less than the electrochemical potential of the metal species to remain in solution.

In the process when a metal contained in the alloy is exchanged with a metallic ion in solution, the alloy is continually consumed and there is no net change in the overall metallic ion content of the aqueous solution, although the nature of the ionic metal has changed.

SUMMARY OF THE INVENTION

In accordance with the practice of the present invention, in a process for the removal of trace quantities of metals where an aqueous solution containing the metals in the ionic state is subjected to direct electrical current in the presence of an anode and a particulate cathode which results in electrodeposition of metals contained in the aqueous solution onto the cathode, a material improvement in the process results from the use as the cathodic material, a particulate silicon metal alloy containing up to about 65% by weight silicon base on the weight of the alloy, the alloy being substantially inert with respect to displacement with the ionic metals contained in the solution and to the action of strong oxidizing acids.

The silicon metal alloys which may be used contains silicon in addition to one or more of the metals, aluminum, chromium, cobalt, iron, manganese, molybdenum, phosphorous, titanium, tungsten and vanadium. Minor amounts of other metals and elements may be present in the alloy provided the alloy remains substantially inert with respect to electrochemical displacement with the metal ions contained in the aqueous solution, and if removed, will be non-contaminating nor will effect the overall function or utility of the base silicon metal alloy. To be avoided are the alloys which display a strong natural displacement tendency with respect to the ionic metals contained in the aqueous solution to be treated. The particularly preferred alloys for broad utility purposes are those which are essentially inert with respect to displacing copper ($Cu^{++}$) in the absence of current flow.

Aside from the relatively passive nature of the particulate silicon metal alloys used as a cathodic material, they are further inert to the action of strong oxidizing acids, such as hyrochloric and nitric acid at a pH of 1 or less, as is typically used to remove the metals from the cathode. Low in initial cost, the alloy is also highly resistant to deterioration in metal recovery techniques which improves markedly the economics of the process in which they are to be used.

THE DRAWING

The attached Drawing schematically illustrates a cell which can be used for the treatment of aqueous solutions containing ionic metallic impurities in accordance with the process of this invention.

DESCRIPTION

It has now been found that in a process for the removal of ionic metallic impurities from aqueous solutions which comprises passing the aqueous solution over a particulate cathodic material to cause electrodeposition of the impurities onto the cathodic material followed by removal of the deposited metals, a material improvement can be obtained by the use, as the cathodic material, of a solid, particulate conductive, silicon metal alloy which essentially is passive to ion exchange with the metals to be removed and resistant to action of strong oxidizing acids.

The silicon-metal alloys contemplated to be used in accordance with the practice of the invention contain silicon in an amount up to about 65.0 percent by weight based on the total weight of the alloy. Typical of the principle metals to be alloyed with silicon there may be mentioned aluminum, chromium, cobalt, iron, manganese, molybdenum, phosphorous (in its metallic or nonmetallic form), titanium, tungsten, vanadium and mixtures thereof. Minor amounts of other elements which are inert or which render the alloy initially active as an ion displacement alloy with respect to one or more of the metals to be removed from solution may be used, provided the exchanging element can be tolerated and will, with use, reduce in content to a level which renders the alloy essentially passive without affecting the ability of the residual alloy to conduct the current required for electrodeposition.

Since the cupric ion is the most common heavy metal to be removed, one criteria for selecting an alloy of wide utility is its passive behavior with respect to ionic displacement with copper. In general, this is indicated by the ability of alloy to remove at equilibrium less than about 20% copper as $Cu^{++}$ from a solution in the absence of current flow. Alloys of this nature have an electrochemical potential below about −0.1 vs the standard hydrogen cell (oxidation potential), preferably equal to or below the electrochemical potential of copper, i.e. −0.345. The metals which can be removed generally have an electrochemical potential less than zinc. Illustrative alloys which meet this criteria, among others, are shown in Table I.

Table I

Alloy Composition Percent by Weight 47.9 V 6.5 Si, 0.8 Al, 0.5 C 43.3 Fe;
25.9 Ti, 3.2 Al, 3.1 Si, 67.0 Fe;
1.3 C, 66.3 Mn, 19.2 Si, 13.0 Fe;
22.0 Fe, 70.0 Cr, 1.0 Si, 0.5 Al, 5.0 C;
55.1 Mn, 26.6 Si, 15.5 Fe;
61.0 Mn, 29.2 Si, 7.4 Fe;
26.0 P, 68.0 Fe; 0.4 Si, 1.0 Mn, 0.1 C;
50.1 Mn, 49.2 Si;
49.0 Al, 50.0 Si;
1.0 Al, 49.0 Si, 49.0 Fe;
8.0 Al, 49.0 Si, 43.0 Fe;
45.6 Ti, 53.8 Si The preferred alloys are those based primarily on silicon and iron and which contain from 40 to about 60% by weight silicon. A particularly preferred alloy is one containing about 50% weight silicon and about 50% by weight iron with aggregate amount of other metals being less than about 2.0% by weight.

The principle benefit of the silicon bound alloys used in the process of this invention is that they are resistant to attack by the highly oxidizing acids, e.g. hydrochloric and nitric, used to remove deposited metals. In contrast, the pure metals which have been used as cathodes dissolve in oxidizing acids at a pH of 1.0 or less. This, as will be appreciated, results in a continuing loss of the cathodic materials during regeneration. The alloys are also resistant to loss of alloying metals during reverse electrolysis which is an alternate route to remove the deposited metals.

For ease in manufacture, the particularly preferred alloys are friable and can be readily crumbled to a particle size for use in the process of this invention. More ductile alloys can also be used. Typical particle size is from about 10 to about 60 mesh depending on specific gravity of the alloy and the solution to be treated. If too fine, the alloys can be lost at high solution flow rates. If too large, the alloys are difficult to maintain in suspension.

In contrast to the function of the silicon based alloys disclosed in U.S. Pat. No. 3,766,036 issued to one of us, the alloys used in accordance with this invention perform as true cathodes on which plating occurs. In the situation contemplated by the process described in U.S. Pat. No. 3,766,036, the exchange of one metal for another in solution occurs. Where the alloys are sufficiently active to cause its metals to actively exchange with the metal ions in solution no appreciable benefit can be gained by inducing current flow, nor will the rate of ion removal from the solution offset the loss of the more active alloying metals to solution. Therefore, the more active alloys described in the patent are undesirable for use in the instant invention.

A simplified cell for use in carrying out the process of this invention is depicted in the attached Drawing. It consists of an anode 10 which may be of any suitable conductive material, such as graphite coupled to a source of direct current source which is, in turn, coupled to a cathode 12 associated with the particulate cathodic silicon metal alloy 14. Cathode 12, preferably externally covered with an insulator 13, serves primarily as a buss to transfer current to the particulate cathodic silicon metal alloy as required to induce plating of heavy metal ions contained in an aqueous solution on the surface thereof. Anode 10 is isolated from the cathodic particles 14 by a membrane 16 which is permeable with respect to the aqueous solution 18 passed through the cell.

The aqueous solution enters at the inlet 20 and is dispersed by a porous or perforated plate 22 of a non-conductive material which distributes the solution over the base of plate 22 and upwards through the cell.

The action of the upward flowing solution, as well as the relatively small fine particle size of the particulate of cathodic silicon metal alloy serves to fluidize or suspend particulate cathodic silicon metal alloys in the flowing solution. Treated solution essentially free of removed ions exits by line 24.

To seal the cell, there is provided insulators 26 at each end and also a vent 28 to exhaust gases, such as hydrogen contained in the aqueous solution to be treated or generated as a consequence of the electrodeposition operation.

The rates of the flow of the impure solution to be treated will vary widely depending on the ionic concentration metals to be removed, the rates at which they plate, and cell temperature. Plating rate will generally increase with temperature. Residence time will depend upon concentration of the metal ions in the aqueous solution, the conductivity of the aqueous medium and the amount of ions to be plated on the surface of the cathodic particles. Cathode 12 is also a surface to potentially be plated, a portion of the metal ions in the solution can plate out on its surface. The amount, however, will be small in comparison to the amount deposited on the surface of the particles. The exposed surface can be minimized by coating the portions of the cathode in contact with the solution and the particulate particles with an insulating polymeric materials exposing only enough of cathode 12 to the solution and the particles to enable sufficient level of the current flow.

A principal criteria associated with operation of the cell is conductivity of the aqueous solution itself. As is well known in the art, the nature of the electrolyte present, i.e. the aqueous solution to be treated can affect electrochemical activity of the metal ions in solution. High conductivity, as indicated by pH, can render an ionic species too electrochemically active to be deposited. In this instance, pH can be actively reduced to insure that all the desired metallic species to be removed will plate on the surface of the particulate cathodic silicon metal alloys. If necessary, an inert salt can be added to the solution to improve conductivity. A preferred salt is sodium sulfate.

With use, the metal ions contained in the aqueous solution to be purified, deposit and accumulate on the surface of the particles. The metal deposited may be tightly or loosely bound depending upon the nature of the silicon metal alloy. It is preferred that the metal be relatively loosely bound in order to facilitate subsequent removal. Where it is loosely bound, however, resistance will grow with time by reducing surface potential. In this instance, the particulate alloys containing the metals deposited are removed from the cell for treatment to separate and recover the deposited metals. Removal can be by mechanical means.

Alternatively, the flow of the aqueous fluid can be interrupted and supplanted by an aqueous electrolyte solution and the current flow reversed to cause reverse electrolysis resulting in electrochemical displacement of the metals from the cathodic particulate silicon-metal alloys.

Chemical treatment is preferably employed. In this instance, there is normally used a strong oxidizing acid to remove the deposited metals. Nitric acid is widely useful and particularly useful for removal of copper, lead and tin. Hydrochloric acid is useful for nickel cadmium and cobalt. Acid concentration can vary widely, although concentration in the range of 10 to 20% are preferred. Because of the highly resistant nature of the silicon metal alloys employed as the cathodic material, alloy lost to the oxidizing acid will be minimal if at all.

Where the electrodeposited metal is tightly bound to the surface alloy, the alloy may be used for protected periods of time without recovery of the deposited metal unless side reactions, such as surface oxidation causes resistance to become excessively great.

In addition to being low in initial cost the cathodic particles are conserved for repeated use in the cell. In the alternative when reverse electrolysis is employed to remove the deposited metals, the alloys being a tightly bound structure display little or no tendency to dissolve during the reverse current flow.

The process of the invention has wide utility ranging from the purification of water to the electrowiring of metals from hydrometallurgical operations. A typical example would be the claiming of copper from strong sulfuric acid solutions resulting from industrial processes where copper concentration is in excess of about 0.1 gram/liter.

EXAMPLES AND CONTROLS

Standard Cell

The standard cell utilized a tube of 304 stainless steel (1 inch O.D. by ¾ inch T.D. and 6.0 inches long) as a cathode connection for the particulate silicon-metal alloy bed. Acting as anode was a graphite rod, ¼ inch in diameter by 6.0 inches in length. The graphite rod was placed in a 5 inch Soxhlett thimble (½ inch diameter) to act as a permeable membrane for the solution, but still electrically separate the anode from the cathode and the particulate alloy. A glass wool plug was placed at the bottom of the stainless steel tube supported by a one hole stopper with tubing leading to a leveling bulb containing heavy metal solution. In each instance, the stainless steel tube was then filled to a depth of about four inches with the silicon alloy which surrounded the Soxhlett thimble. Above the alloy bed was a small ¼ inch stainless steel side arm for discharging the treated solution after alloy contact. Keeping the anode secured at the top of the cell was a one hole cork. The stainless steel tube and side arm were wrapped with electrical insulating tape. The tubular cathode and anode were connected to a variable D.C. source. There was provided reservoir for the fluid for the treatment and collections as well as means to control flow rate through the cell. Unless otherwise indicated the operation was at ambient temperature.

EXAMPLES 1 TO 3 AND CONTROL A

There was used the standard cell and a ferrosilicon alloy (1% Al, 49.0% Si, 49.0% Fe) weighing 44.5 grams and occupying a bulk volume of 17.0 ml. The alloy was of 30 mesh particle size. The solution processed contained 25 ppm $Cu^{++}$ and 25 ppm $Ni^{++}$ as well as 1.0 gram per liter of $Na_2SO_4$. Solution was pH of 5.30. Table II shows the amount of copper and nickel removed as measured by the amount remaining in solution. Control A shows the alloy to be passive with respect to both nickel and copper.

Table II

|  | Voltage | Amps | Volume Treated (ml.) | Total Treatment Time (min) | pH | Ionic Content of Residual Solution Cu (ppm) | Ni (ppm) |
| --- | --- | --- | --- | --- | --- | --- | --- |
| Example 1 | 4.0 | 0.10 | 50.0 | 10 | 3.5 | 16.7 | 16.6 |
| Example 2 | 5.5 | 0.30 | 50.0 | 12 | 3.1 | 11.8 | 13.5 |
| Example 3 | 8.0 | 0.60 | 50.0 | 14 | 5.9 | 9.4 | 12.0 |
| Control A | 0.0 | 0.00 | 50.0 | 12 | 5.3 | 25.0 | 25.0 |

Both copper and nickel were chosen for study as they are quite frequently encountered in discharge waters and they represent a fair range of electromotive oxidation potentials; copper −0.345 and nickel +0.230 versus the standard hydrogen electrode.

EXAMPLES 4 TO 6

Using the standard cell and alloy described for Examples 1 to 3, the ability of the alloy to win copper was compared to alloy loss to solution. The test solution contained 25 ppm $Cu^{++}$ and 1 gram per liter $Na_2SO_4$. Solution pH was 5.0 and flow rate through the cell was 5 ml per minute. The results shown are Table III.

Table III

|  | Voltage | Amps | Volume (ml) | Time (min) | pH Effluent | Cu | Si | Fe |
| --- | --- | --- | --- | --- | --- | --- | --- | --- |
|  |  |  |  |  |  | (ppm in Solution) | | |
| Example 4 | 4.1 | 0.10 | 50.0 | 11 | 2.9 | 21.0 | 0.1 | 0.1 |
| Example 5 | 5.7 | 0.30 | 50.0 | 11 | 2.7 | 8.0 | 0.1 | 0.1 |
| Example 6 | 8.4 | 0.60 | 50.0 | 12 | 3.3 | 5.1 | 0.1 | 0.1 |

The electrode was most effective for copper removal while silicon and iron loss to solution were minimal.

In recovering the deposited copper by contacting with 30% nitric acid, it was found the deposited copper was distributed between the alloy and the stainless steel cell wall in a ratio of alloy to a wall of 3:1. Also about half of the deposited copper was rather loosely held and could be removed by water slurrying.

It is also apparent from Table III that the pH tends to drop after initial electrolysis which has little or no effect on alloy dissolution.

To evaluate corrosion loss of the alloy to a 10% nitric solution, 10 grams of the alloy was contacted with 10% nitric acid for 30 minutes. Take-up by the acid in ppm was Fe = 0.10; Ni = <0.2; Cr = 0.05; Si = <1.5.

EXAMPLES 7 TO 9 AND CONTROL B

Using the standard cell there was used an alloy of the composition: 26.0% by weight P; 0.4% by weight Si; 0.1% by weight C; 1.0% by weight Mn and 68.0% by weight Fe. Mesh size was 30 mesh. Data for heavy metal (copper and nickel) removal for current flow and in the absence of current flow is shown in Table IV.

Table IV

|  | Voltage | Amps | Volume (ml) | Time (min) | pH | Cu | Ni | Fe |
| --- | --- | --- | --- | --- | --- | --- | --- | --- |
|  |  |  |  |  |  | (ppm in solution) | | |
| Example 7 | 2.8 | 0.10 | 50 | 16 | 3.0 | 5.0 | 8.7 | 6.6 |
| Example 8 | 4.5 | 0.30 | 50 | 18 | 4.0 | 0.9 | 1.8 | 3.4 |
| Example 9 | 6.5 | 0.60 | 50 | 18 | 7.0 | 0.3 | 1.0 | 2.8 |
| Control B | 0.0 | 0.00 | 50 | 16 | 2.0 | 21.6 | 25.0 | 3.1 |

Element loss in ppm to 10% nitric acid in the corrosion test described for Examples 4 to 6 was Fe = 5.6; Ni = <0.2; Cr = <0.2; Cu = <0.3; Si ≤ 1.5.

EXAMPLES 10 TO 12 AND CONTROL C

Using the standard cell there was used a 20 mesh alloy of the composition 5.0% by weight C; 70.0% by weight Cr; 1.0% by weight Si; 0.5% by weight Al and 22% by weight Fe. Data for copper and nickel removal with current flow and in the absence of current flow is shown in Table V.

Table V

|  | Voltage | Amps | Volume (ml) | Time (min) | pH | Cu | Ni | Fe | Cr |
| --- | --- | --- | --- | --- | --- | --- | --- | --- | --- |
|  |  |  |  |  |  | (ppm in solution) | | | |
| Example 10 | 3.0 | 0.10 | 50 | 19 | 2.7 | 0.7 | 10.6 | 3.6 |  |
| Example 11 | 4.3 | 0.30 | 50 | 23 | 4.2 | 0.6 | 6.2 | 2.9 | 0.4 |
| Example 12 | 6.6 | 0.60 | 50 | 18 | 6.7 | 0.6 | 5.5 | 2.8 | 0.6 |
| Control C | 0.0 | 0.00 | 50 | 18 | 2.1 | 17.1 | 25.0 | 9.2 | 1.3 |

Element loss in ppm to 10% nitric acid in the corrosion test described for Examples 4 to 6 was Fe = 176; Ni = 2.2; Cr = 90.7; Cu = 0.05; Si = 15.0.

CONTROLS D TO F

There was an alloy of 8.9% by weight Mg; 45.2% by weight Si and 46.0% by weight Fe. The alloy was established to actively exchange with copper in the absence of current flow showed little improvement when current flow was induced. In addition, loss of alloy species to solution was aggravated. For the test, the solution contained 25 ppm $Cu^{++}$ and 1.0 gram per liter $Na_2SO_4$ at a pH of 5.9. Volume flow rate was 2.5 ml per minute. The results are shown in Table VI.

Table VI

|  | Voltage | Amps | Volume (ml) | Time (min) | pH Effluent | Cu | Mg | Si | Fe |
| --- | --- | --- | --- | --- | --- | --- | --- | --- | --- |
|  |  |  |  |  |  |  | (ppm in solution) | | |
| Control D | 0.0 | 0.0 | 50 | 20 | 10.3 | 0.3 | 28.0 | 1.4 | 0.1 |
| Control E | 7.2 | 0.10 | 50 | 19 | 11.0 | 0.2 | 20.0 | 3.4 | 0.1 |
| Control F | 10.0 | 0.22 | 50 | 18 | 9.4 | 0.8 | 60.0 | 11.6 | 0.0 |

What is claimed is:

1. In a process for removing ionic metals from aqueous solutions wherein the aqueous solution is subjected to direct electric current in the presence of at least one anode and a particulate cathode resulting in electrodeposition of the metal on the cathode, the improvement which comprises using as the particulate cathode a conductive silicon-metal alloy containing up to about 65 percent by weight silicon based on the total weight of the alloy, said alloy being essentially passive with respect to ionic displacement with the ionic metal contained in the aqueous solution and substantially inert with respect to the action of oxidizing acids used to remove electrodeposited metals from the surface of the alloy.

2. The process as claimed in claim 1 in which the silicon metal alloy has an electrochemical potential of about −0.1 or below.

3. The process as claimed in claim 2 in which the silicon-metal alloy has a particle size from about 10 to 60 mesh.

4. The process as claimed in claim 1 in which the silicon-metal alloy contains about 50% by weight silicon and about 50% by weight iron based on the total weight of the alloy.

5. The process as claimed in claim 4 in which the silicon-metal alloy has a particle size from about 10 to 60 mesh.

6. The process as claimed in claim 1 in which at least one metal of the silicon-metal alloy is selected from the group consisting of aluminum, chromium, cobalt, iron, manganese, molybdenum, phosphorous, titanium, tungsten, vanadium and mixtures thereof.

7. The process as claimed in claim 1 in which the silicon-metal alloy has a particle size from about 10 to 60 mesh.

8. The process as claimed in claim 1 in combination with removing the electrodeposited metal from the surface of the alloy by contact with an oxidizing acid.

9. In a process for removing ionic metals from aqueous solutions wherein the aqueous solution is subjected to direct electric current in the presence of at least one anode and a particulate cathode resulting in electrodeposition of the metal on the cathode, the improvement which comprises using as the particulate cathode a conductive silicon-metal alloy containing about 26.0% by weight phosphorous, about 0.5% by weight silicon, about 0.1% by weight carbon, about 1.0% by weight manganese and about 68.0% by weight iron based on the total weight of the alloy, said alloy being essentially passive with respect to ionic displacement with the ionic metal contained in the aqueous solution and substantially inert with respect to the action of oxidizing acids used to remove electrodeposited metals from the surface of the alloy.

10. The process as claimed in claim 9 in which the silicon-metal alloy has a particle size from about 10 to about 60 mesh.

11. In a process for removing ionic metals from aqueous solutions wherein the aqueous solution is subjected to direct electric current in the presence of at least one anode and a particulate cathode, resulting in electrodeposition the metal on the cathode, the improvement which comprises using as the particulate cathode a conductive silicon-metal alloy containing up to about 65 percent by weight silicon based on the total weight of the alloy of a particle size from about 10 to about 40 mesh, and having an electrochemical potential of about −0.1 or less, said alloy being essentially passive with respect to ionic displacement with the ionic metals contained in the aqueous solution, and substantially inert with respect to the action of oxidizing acids used to remove electrodeposited metals from the surface of the alloy.

12. The process as claimed in claim 11 in which at least one metal of the silicon-metal alloy is selected from the group consisting of aluminum, chromium, cobalt, iron, manganese, molybdenum, phosphorous, titanium, tungsten, vanadium and mixtures thereof.

13. The process as claimed in claim 11 in which the silicon-metal alloy contains about 50% by weight silicon and about 50% by weight iron based on the total weight of the alloy.

14. The process as claimed in claim 11 in combination with the step of removing electrodeposited metal from the surface of the cathode by contact with an oxidizing acid.

15. In a process for removing ionic metals from aqueous solutions when the aqueous solution is subjected to direct electric current in the presence of at least one anode, and a particulate cathode to electrodeposit the metal on the cathode, the improvement which comprises using as the particulate cathode a conductive silicon-metal alloy containing about 50% by weight silicon and about 50% by weight iron based on the total weight of the alloy, said alloy being essentially passive with respect to ionic displacement with the ionic metals contained in the aqueous solution and substantially inert with respect to the action of oxidizing acids used to remove electrodeposited metals from the surface of the alloy.

16. The process as claimed in claim 15 in which the silicon-metal alloy has a particle size from about 10 to about 60 mesh.

17. The process as claimed in claim 15 in combination with the step of removing electrodeposited metal from the surface of the cathode by contact with an oxidizing acid.

* * * * *

UNITED STATES PATENT AND TRADEMARK OFFICE
CERTIFICATE OF CORRECTION

PATENT NO. : 3,988,221  PAGE 1 of 2
DATED : October 26, 1976
INVENTOR(S) : Donald E. Garrett/James P. McKaveney It is certified that error appears in the above-identified patent and that said Letters Patent are hereby corrected as shown below:

Column 6, lines 32-37, read as:

"Table II

| Voltage | Amps | Volume Treated (ml.) | Total Treatment Time (min) | pH | Ionic Content of Residual Solution | |
|---|---|---|---|---|---|---|
| | | | | | Cu (ppm) | Ni (ppm) |

"

these lines should read as:

-- Table II

| Voltage | Amps | Volume Treated (ml.) | Total Treatment Time (min) | pH | Ionic Content of Residual Solution | |
|---|---|---|---|---|---|---|
| | | | | | Cu (ppm) | Ni (ppm) |

--

Column 7, lines 30-32, read as:

"Table IV

| Voltage | Amps | Volume (ml) | Time (min) | pH | Cu | Ni | Fe |
|---|---|---|---|---|---|---|---|
| | | | | | (ppm in solution) | | |

"

UNITED STATES PATENT AND TRADEMARK OFFICE
CERTIFICATE OF CORRECTION

PATENT NO. : 3,988,221
DATED : October 26, 1976
INVENTOR(S) : Donald E. Garrett/James P. McKaveney It is certified that error appears in the above-identified patent and that said Letters Patent are hereby corrected as shown below:

these lines should read as:

—Table IV

| Voltage | Amps | Volume (ml) | Time (min) | pH | Cu | Ni | Fe |
|---|---|---|---|---|---|---|---|
| | | | | | (ppm in solution) | | |

Column 7, lines 51-54, read as:

"Table V

| | Voltage | Amps | Volume (ml) | Time (min) | pH | Cu | Ni | Fe | Cr |
|---|---|---|---|---|---|---|---|---|---|
| | | | | | | (ppm in solution) | | | |
| Example 10 | 3.0 | 0.10 | 50 | 19 | 2.7 | 0.7 | 10.6 | 3.6 | " | these lines should read as:

—Table V

| | Voltage | Amps | Volume (ml) | Time (min) | pH | Cu | Ni | Fe | Cr |
|---|---|---|---|---|---|---|---|---|---|
| | | | | | | (ppm in solution) | | | |
| Example 10 | 3.0 | 0.10 | 50 | 19 | 2.7 | 0.7 | 10.6 | 3.6 | 0.4 |

Signed and Sealed this

Fifteenth Day of February 1977

[SEAL]

Attest:

RUTH C. MASON
*Attesting Officer*

C. MARSHALL DANN
*Commissioner of Patents and Trademarks*